United States Patent
Lair

(10) Patent No.: US 8,051,639 B2
(45) Date of Patent: Nov. 8, 2011

(54) THRUST REVERSER

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 1025 days.

(21) Appl. No.: 11/941,388

(22) Filed: Nov. 16, 2007

(65) Prior Publication Data

US 2009/0126341 A1    May 21, 2009

(51) Int. Cl.
*F02K 3/02*    (2006.01)

(52) U.S. Cl. .................................. 60/226.2; 60/230

(58) Field of Classification Search ................. 60/226.2, 60/262; 239/265.19; 244/110 B
See application file for complete search history.

(56) References Cited

U.S. PATENT DOCUMENTS

| | | |
|---|---|---|
| 2,847,823 A | 8/1958 | Brewer |
| 3,347,578 A | 10/1967 | Sheehan et al. |
| 3,492,821 A | 2/1970 | Monaghan et al. |
| 3,541,794 A | 11/1970 | Johnston et al. |
| 3,550,855 A | 12/1970 | Feld et al. |
| 3,610,534 A | 10/1971 | Medawar |
| 3,640,468 A | 2/1972 | Searle et al. |
| 3,660,982 A | 5/1972 | Gozlan |
| 3,684,182 A | 8/1972 | Maison |
| 3,856,239 A | 12/1974 | Leibach |
| 3,973,731 A * | 8/1976 | Thayer ..................... 239/265.39 |
| 4,047,381 A | 9/1977 | Smith |
| 4,129,269 A | 12/1978 | Fage |
| 4,175,385 A | 11/1979 | Nash |
| 4,182,501 A | 1/1980 | Fage |
| 4,212,442 A | 7/1980 | Fage |
| 4,232,516 A | 11/1980 | Lewis et al. |
| 4,292,803 A | 10/1981 | Prior |
| 4,362,015 A | 12/1982 | Fage |
| 4,422,605 A | 12/1983 | Fage |
| 4,424,669 A | 1/1984 | Fage |
| 4,519,561 A | 5/1985 | Timms |
| 4,581,890 A | 4/1986 | Giraud |
| 4,682,733 A | 7/1987 | Newton |
| 4,801,112 A | 1/1989 | Fournier |
| 4,830,519 A | 5/1989 | Starke |
| 4,836,451 A | 6/1989 | Herrick et al. |
| 4,860,956 A | 8/1989 | Fage |
| 4,865,256 A | 9/1989 | Durand |

(Continued)

FOREIGN PATENT DOCUMENTS

FR    2601077    1/1988

(Continued)

OTHER PUBLICATIONS

U.S. Appl. No. 11/941,378, filed Nov. 16, 2007, entitled "Thrust Reverser for a Turbofan Gas Turbine Engine", by Jean-Pierre Lair.

(Continued)

*Primary Examiner* — Louis Casaregola
*Assistant Examiner* — Phutthiwat Wongwian
(74) *Attorney, Agent, or Firm* — Francis L. Conte

(57) ABSTRACT

The thrust reverser is used with an aircraft gas turbine engine and includes upper and lower doors pivotable between a stowed position and a deployed position. When deployed, the doors redirect a portion of the efflux to generate a nose-down pitching moment on an aircraft to improve handling during thrust reversing on a runway.

23 Claims, 4 Drawing Sheets

U.S. PATENT DOCUMENTS

| | | |
|---|---|---|
| 4,894,985 A | 1/1990 | Dubois |
| 4,909,346 A | 3/1990 | Torkelson |
| 4,914,905 A | 4/1990 | Dubois |
| 4,916,895 A | 4/1990 | Dubois |
| 4,922,712 A | 5/1990 | Matta |
| 4,922,713 A | 5/1990 | Barbarin |
| 4,960,243 A | 10/1990 | Dubois |
| 4,966,327 A | 10/1990 | Fage |
| 4,976,466 A | 12/1990 | Vauchel |
| 4,998,409 A | 3/1991 | Mutch |
| 5,003,770 A | 4/1991 | Schegerin |
| 5,039,171 A | 8/1991 | Lore |
| 5,040,730 A | 8/1991 | Hogie |
| 5,083,426 A | 1/1992 | Layland |
| 5,090,197 A | 2/1992 | Dubois |
| 5,097,661 A | 3/1992 | Lair et al. |
| 5,101,621 A | 4/1992 | Mutch |
| 5,117,630 A | 6/1992 | Cariola |
| 5,120,004 A | 6/1992 | Matthias |
| 5,167,118 A | 12/1992 | Torkelson |
| 5,176,340 A | 1/1993 | Lair |
| 5,181,676 A | 1/1993 | Lair |
| 5,192,023 A | 3/1993 | Fage et al. |
| 5,197,693 A | 3/1993 | Remlaoui |
| 5,203,525 A | 4/1993 | Remlaoui |
| 5,209,057 A | 5/1993 | Remlaoui |
| 5,211,008 A | 5/1993 | Fage |
| 5,221,048 A | 6/1993 | Lair |
| 5,224,342 A | 7/1993 | Lair |
| 5,228,641 A | 7/1993 | Remlaoui |
| 5,230,213 A | 7/1993 | Lawson |
| 5,243,817 A | 9/1993 | Matthias |
| 5,251,435 A | 10/1993 | Pauley |
| 5,267,438 A | 12/1993 | Bunel |
| 5,284,015 A | 2/1994 | Carimali |
| 5,297,387 A | 3/1994 | Carimali |
| 5,309,711 A | 5/1994 | Matthias |
| 5,310,117 A | 5/1994 | Fage et al. |
| 5,347,808 A | 9/1994 | Standish |
| 5,372,006 A | 12/1994 | Lair |
| 5,390,879 A | 2/1995 | Lair |
| 5,392,991 A | 2/1995 | Gatti |
| 5,396,762 A | 3/1995 | Standish |
| 5,419,515 A | 5/1995 | Lair |
| 5,440,875 A | 8/1995 | Torkelson |
| 5,473,886 A | 12/1995 | Lebrun |
| 5,524,431 A | 6/1996 | Brusson |
| 5,548,954 A | 8/1996 | de Cambray |
| 5,558,594 A | 9/1996 | Lefranc |
| 5,615,549 A | 4/1997 | Valleroy |
| 5,615,834 A | 4/1997 | Osman |
| 5,655,360 A | 8/1997 | Butler |
| 5,666,802 A | 9/1997 | Lair |
| 5,671,598 A | 9/1997 | Standish |
| 5,716,025 A | 2/1998 | Meyer |
| 5,720,449 A | 2/1998 | Laboure |
| 5,725,182 A | 3/1998 | Valleroy |
| 5,727,380 A | 3/1998 | Lardy et al. |
| 5,730,392 A | 3/1998 | Lair |
| 5,765,362 A | 6/1998 | Gonidec |
| 5,775,097 A | 7/1998 | Lardy |
| 5,775,639 A | 7/1998 | Fage |
| 5,778,659 A * | 7/1998 | Duesler et al. ............... 60/226.1 |
| 5,778,660 A | 7/1998 | Jean |
| 5,779,191 A * | 7/1998 | Brislawn ...................... 244/75.1 |
| 5,779,192 A | 7/1998 | Metezeau et al. |
| 5,782,434 A | 7/1998 | Jean |
| 5,785,249 A | 7/1998 | Metezeau |
| 5,794,433 A | 8/1998 | Peters |
| 5,799,903 A | 9/1998 | Vauchel |
| 5,806,302 A | 9/1998 | Cariola |
| 5,813,220 A | 9/1998 | Portal |
| 5,819,527 A | 10/1998 | Fournier |
| 5,819,528 A | 10/1998 | Masson |
| 5,826,823 A | 10/1998 | Lymons |
| 5,836,149 A | 11/1998 | Servanty |
| 5,852,928 A | 12/1998 | Vauchel |
| 5,853,148 A | 12/1998 | Standish |
| 5,863,014 A | 1/1999 | Standish |
| 5,875,995 A | 3/1999 | Moe |
| 5,893,265 A | 4/1999 | Gonidec |
| 5,899,059 A | 5/1999 | Gonidec |
| 5,904,041 A | 5/1999 | Dhainault |
| 5,913,476 A | 6/1999 | Gonidec |
| 5,927,647 A | 7/1999 | Masters |
| 5,930,991 A | 8/1999 | Fournier |
| 5,934,613 A | 8/1999 | Standish |
| 5,937,636 A | 8/1999 | Gonidec |
| 5,947,625 A | 9/1999 | Vauchel |
| 5,956,939 A | 9/1999 | Fage |
| 5,960,626 A | 10/1999 | Baudu |
| 5,967,460 A | 10/1999 | Baudu |
| 5,970,704 A | 10/1999 | Lardy |
| 5,974,783 A | 11/1999 | Gonidec |
| 5,983,625 A | 11/1999 | Gonidec |
| 5,987,881 A | 11/1999 | Gonidec |
| 5,996,937 A | 12/1999 | Gonidec |
| 5,997,054 A | 12/1999 | Baudu |
| 6,000,216 A | 12/1999 | Vauchel |
| 6,009,702 A | 1/2000 | Gonidec |
| 6,026,638 A | 2/2000 | Gonidec |
| 6,027,071 A | 2/2000 | Lair |
| 6,029,439 A | 2/2000 | Gonidec |
| 6,032,901 A | 3/2000 | Carimali |
| 6,044,641 A | 4/2000 | Baudu |
| 6,045,091 A | 4/2000 | Baudu |
| 6,065,285 A | 5/2000 | Gonidec |
| 6,068,213 A | 5/2000 | Gonidec |
| 6,076,347 A | 6/2000 | Gonidec |
| 6,079,201 A | 6/2000 | Jean |
| 6,082,096 A | 7/2000 | Vauchel |
| 6,094,908 A | 8/2000 | Baudu |
| 6,101,807 A | 8/2000 | Gonidec |
| 6,105,439 A | 8/2000 | Roger |
| 6,145,301 A | 11/2000 | Gonidec |
| 6,145,786 A | 11/2000 | Baudu |
| 6,148,607 A | 11/2000 | Baudu |
| 6,151,884 A | 11/2000 | Gonidec |
| 6,151,885 A | 11/2000 | Metezeau |
| 6,151,886 A | 11/2000 | Vauchel |
| 6,158,211 A | 12/2000 | Gonidec |
| 6,170,254 B1 | 1/2001 | Cariola |
| 6,170,255 B1 | 1/2001 | Gonidec |
| 6,173,807 B1 | 1/2001 | Welch et al. |
| 6,216,980 B1 | 4/2001 | Baudu |
| 6,237,325 B1 | 5/2001 | Hogie |
| 6,256,979 B1 | 7/2001 | Fournier |
| 6,260,801 B1 | 7/2001 | Peters |
| 6,276,026 B1 | 8/2001 | Wille |
| 6,293,495 B1 | 9/2001 | Aten |
| 6,357,672 B1 | 3/2002 | Cowan et al. |
| 6,385,964 B2 | 5/2002 | Jean |
| 6,402,092 B1 | 6/2002 | Jean |
| 6,438,942 B2 | 8/2002 | Fournier |
| 6,487,845 B1 | 12/2002 | Modglin |
| 6,546,715 B1 | 4/2003 | Blevins |
| 6,546,716 B2 | 4/2003 | Lair |
| 6,568,172 B2 | 5/2003 | Jannetta et al. |
| 6,584,763 B2 | 7/2003 | Lymons |
| 6,592,074 B2 | 7/2003 | Dehu |
| 6,622,964 B2 | 9/2003 | Rouyer |
| 6,688,098 B2 | 2/2004 | Rouyer |
| 6,688,099 B2 | 2/2004 | Lair |
| 6,751,944 B2 | 6/2004 | Lair |
| 6,786,038 B2 | 9/2004 | Lair |
| 6,804,947 B2 | 10/2004 | Le Docte |
| 6,820,410 B2 | 11/2004 | Lair |
| 6,845,607 B2 | 1/2005 | Lair |
| 6,845,946 B2 | 1/2005 | Lair |
| 6,895,742 B2 | 5/2005 | Lair et al. |
| 6,910,328 B1 | 6/2005 | Joyce |
| 6,926,234 B2 | 8/2005 | Colotte |
| 6,938,408 B2 | 9/2005 | Lair |
| 6,945,031 B2 | 9/2005 | Lair |
| 6,966,175 B2 | 11/2005 | Lair |
| 6,968,675 B2 | 11/2005 | Ramlaoui et al. |
| 6,971,229 B2 | 12/2005 | Lair |

| | | |
|---|---|---|
| 6,976,352 B2 | 12/2005 | Lair |
| 6,983,588 B2 | 1/2006 | Lair |
| 6,993,819 B2 | 2/2006 | Homann |
| 7,007,454 B2 | 3/2006 | Dehu |
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,127,880 B2 | 10/2006 | Lair |
| 7,146,796 B2 | 12/2006 | Lair |
| 7,229,247 B2 | 6/2007 | Durocher et al. |
| 7,255,307 B2 | 8/2007 | Mayes |
| RE039,972 E | 1/2008 | Royalty |
| 2004/0139726 A1 | 6/2004 | Colotte |
| 2005/0151012 A1 | 7/2005 | Lair |
| 2005/0183894 A1 | 8/2005 | Lair |
| 2006/0005530 A1 | 1/2006 | Blin |
| 2006/0288688 A1 | 12/2006 | Lair |
| 2008/0072570 A1 | 3/2008 | Lair |

FOREIGN PATENT DOCUMENTS

WO  86/00862 A1  2/1986

OTHER PUBLICATIONS

U.S. Appl. No. 11/941,360, filed Nov. 16, 2007, entitled "Thrust Reverser Door", by Jean-Pierre Lair.

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,391, filed Nov. 16, 2007, entitled "Thrust Reverser Door", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

US 8,051,639 B2

THRUST REVERSER

TECHNICAL FIELD

The invention relates to thrust reversers for gas turbine engines.

BACKGROUND

It is generally desired to assist wheel braking using aerodynamic decelerating means on aircrafts equipped with gas turbine engines because of the high landing speeds of these aircrafts. The aerodynamic decelerating means are especially useful on wet or icy runways to enhance the stopping capability of aircrafts. A thrust reverser is one example of such aerodynamic decelerating means. A thrust reverser deflects at least a portion of the efflux from a gas turbine engine to create a braking force slowing down the aircraft.

Many different models of thrust reversers have been suggested since they exist. However, it always remains desirable to, among other things, improve the design of the thrust reversers so as to obtain additional benefits during their operation, one example being an improved handling of the aircraft on the ground during braking.

SUMMARY

In one aspect, the present concept provides a thrust reverser for a nacelle of a gas turbine engine, the thrust reverser comprising an upper reverser door and a lower reverser door defining a portion of an aft section of the nacelle, the doors having a respective trailing edge adjacent to a propulsive jet outlet of the nacelle, the doors being pivotable together between respective stowed and a deployed positions, the trailing edge of the upper door being positioned behind the trailing edge of the lower door in the deployed position, the trailing edges of the doors in the deployed position delimiting a rear opening that is generally oriented aft and downwardly relative to the engine, the rear opening communicating in use with a portion of thrust generated by the engine.

In another aspect, the present concept provides thrust reverser for a gas turbine engine of an aircraft, the thrust reverser comprising an upper door and a lower door pivotable between a stowed position and a deployed position, the doors configured and disposed in the deployed position to redirect a first portion of an engine thrust forwardly to create a braking force and a second portion of the engine thrust downwardly to create a nose-down pitching moment on the aircraft.

In another aspect, the present concept provides a method of thrust reversing an aircraft on a runway, the aircraft having at least one gas turbine engine producing an efflux, the method comprising the steps of: (a) generating a braking force by redirecting a first portion of the efflux; and (b) generating a nose-down pitching moment on the aircraft by redirecting a second portion of the efflux at a rear of the engine.

Further details of these and other aspects of the improvements presented herein will be apparent from the detailed description and appended figures.

DETAILED DESCRIPTION

Figure 1:
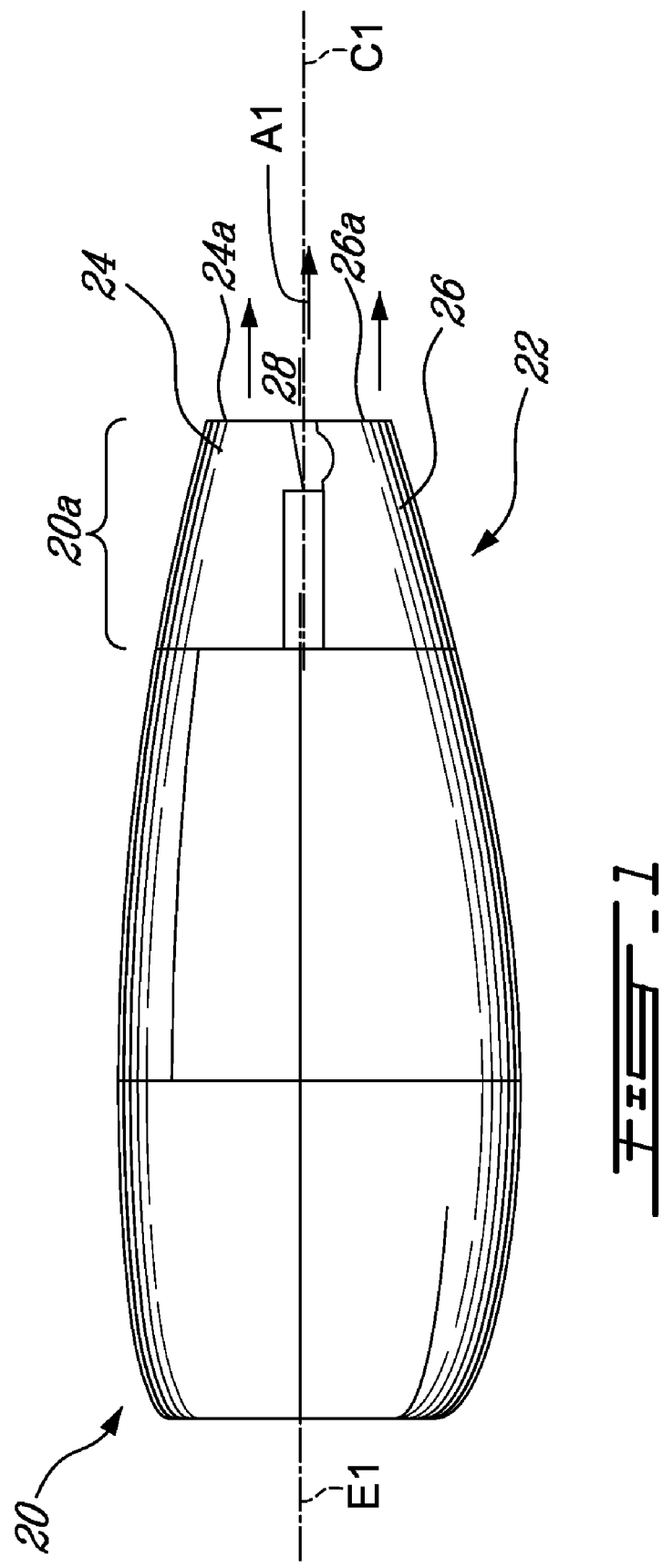
FIG. 1 is a side view of an example of a nacelle provided with a thrust reverser according to the present description, its doors being shown in a stowed position.

Referring to FIG. 1, there is shown an example of a nacelle 20 including a target/bucket door type thrust reverser 22 in the aft section 20a of the nacelle 20. The turbofan gas turbine engine is located within the nacelle 20 and the nacelle 20 is attached under the wings or on the fuselage of the aircraft using an appropriate arrangement (not shown). The thrust reverser 22 comprises two opposite pivoting doors 24, 26 forming most of the propulsive jet outlet of the nacelle 20 when they are in their stowed position. One door 24 is at the upper side and the other door 26 is at the bottom side. The doors 24, 26 have trailing edges which are generally semi-circular. The centerline C1 of the thrust reverser is preferably collinear with the centerline E1 of the engine. This permits forward thrust produced by the engine to be substantially unaffected by the thrust reverser installation, as will be discussed below.

Each door 24, 26 has a trailing edge 24a, 26a adjacent to the propulsive jet outlet 28. The arrows A1 in FIG. 1 show the direct thrust operation of the engine. The thrust reverser 22 is then inactive. As additionally shown in FIG. 2, the trailing edges 24a, 26a cooperate with the trailing edge of side arms 32 of a jet pipe 30 located inside the aft section 20a of the nacelle 20 and to which the doors 24, 26 are pivotally connected. The leading edges 24b, 26b of the doors 24, 26 and their outer wall form a smooth continuity with the upstream parts of the nacelle 20 when the doors 24, 26 are in the closed position.

Figure 2:
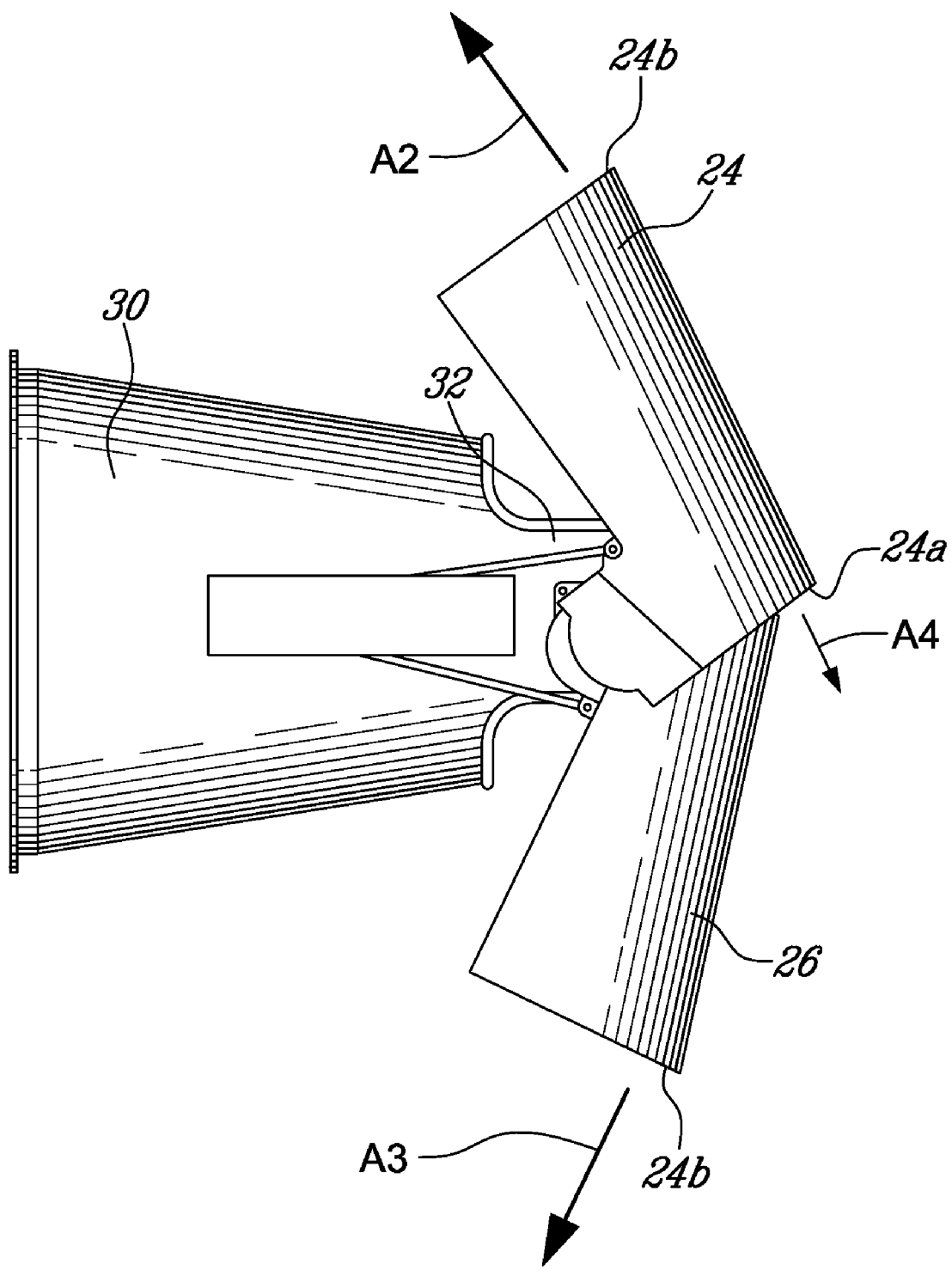
FIG. 2 is a schematic view showing an example of the present thrust reverser doors in a deployed position.

The side arms 32 are shown in FIG. 2, which figure schematically shows an example of the interior side of the thrust reverser 22. The jet pipe 30 is concealed inside the aft section 20a of nacelle 20 when the doors 24, 26 are in their stowed position, as in FIG. 1.

The engine is in a thrust reversal mode in FIG. 2. This mode is generally used immediately after landing an aircraft on a runway. The doors 24, 26 are pivoted to that position simultaneously using actuators (not shown). The arrows A2, A3 in FIG. 2 indicate the main flow path of the efflux coming out of the engine when operated during the thrust reversal. As can be seen, a large portion of the gases coming out of the engine are deviated substantially toward the front. The gases exit the doors 24, 26 in the vicinity of their leading edges 24b, 26b. These edges are located at the front of the doors 24, 26 and are referred to as "leading" edges with reference to the travel path of the aircraft. The deviation of the gases creates a resulting horizontal retarding force opposing the forward movement of the aircraft. Increasing the output thrust generated by the engine creates an increased aerodynamic decelerating force, thus more braking.

Figure 3:
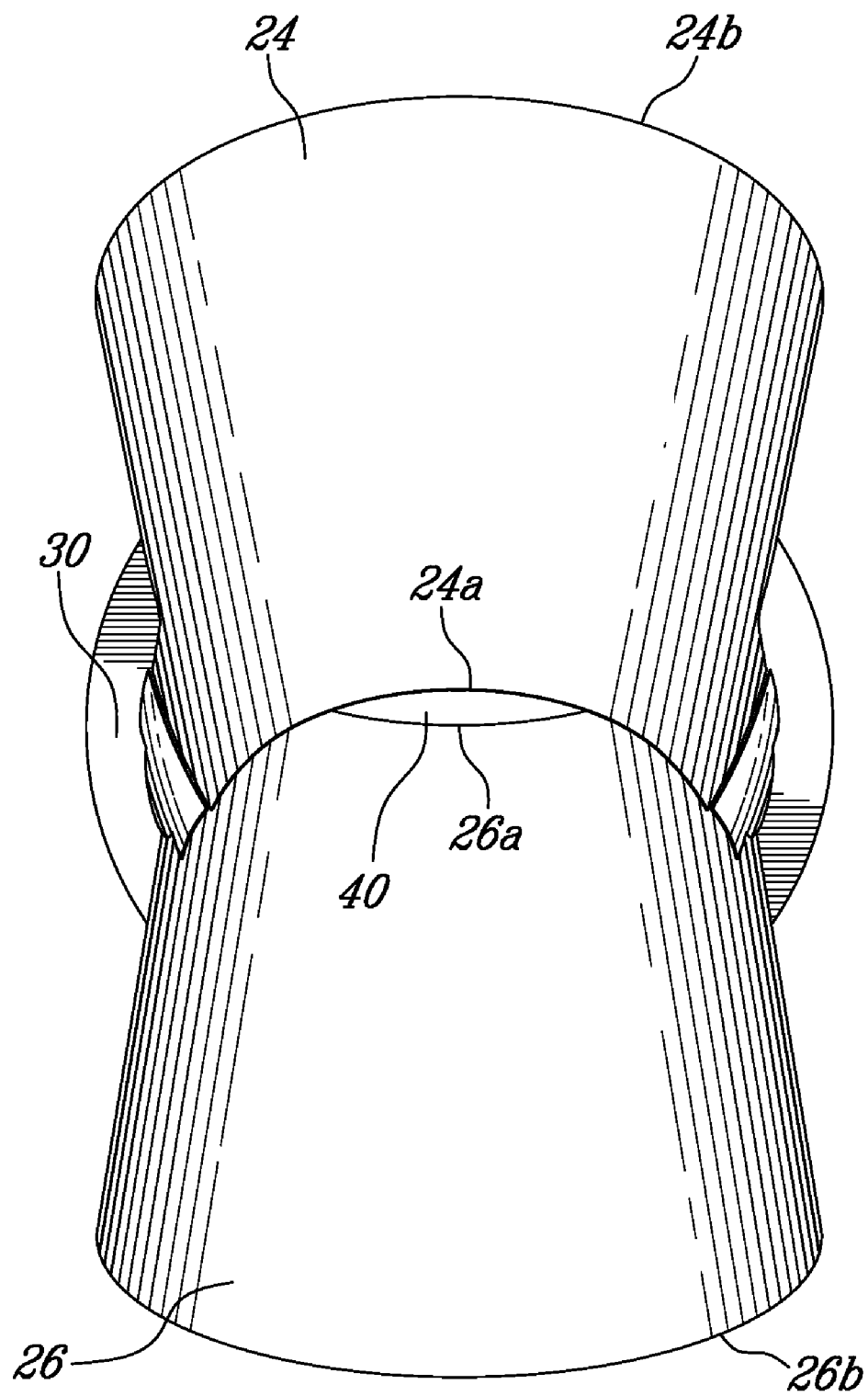
FIG. 3 is a rear view of FIG. 2.

FIGS. 2 and 3 show that the trailing edge 24a of the upper door 24 is pivoted behind the trailing edge 26a of the lower door 26 when the doors 24, 26 are deployed. This can be achieved, for example, from an asymmetrical positioning of the door pivots with reference to the horizontal center plane of the jet pipe 30, such as is disclosed in applicant's co-pending application Ser. No. 11/534,202, filed Sep. 21, 2006. FIG. 3 shows a rear view of the doors of FIG. 2.

FIG. 3 shows that a portion of the efflux exits through a crescent-shaped rear opening 40 defined between the trailing edges 24a, 26a of the doors 24, 26, as shown by the small arrow A4 in FIG. 2. The rear opening 40 is generally oriented downwards, as the plane of the opening 40 faces the rear and has a downward orientation. The flow of gas out of the rear opening 40 is then oriented toward the rear bottom. It generates a resulting force creating a nose down pitching moment on the aircraft because the force has an upward vertical component and that it is at the rear of the engine. This force also has a horizontal component opposing the braking force on the aircraft but its magnitude is much smaller than the braking force and consequently the overall retarding force produced by the thrust reverser is substantially unaffected. The nose down pitching moment during aircraft landing with the reverser deployed improves the controllability of the aircraft on the ground, but when the reverser is in its stowed configuration, the forward thrust produced by the engine is not affected as the centerlines of the engine and of the reverser are collinear. In other words, the configuration of the present thrust reverser does not require modification of the angle of the thrust vector produced by the engine when the reverser is in its stowed position. Also, when the reverser is in its deployed position, it generates a nose down pitching moment to the aircraft without substantially affecting the overall retarding force produced by the thrust reverser.

Figure 4:
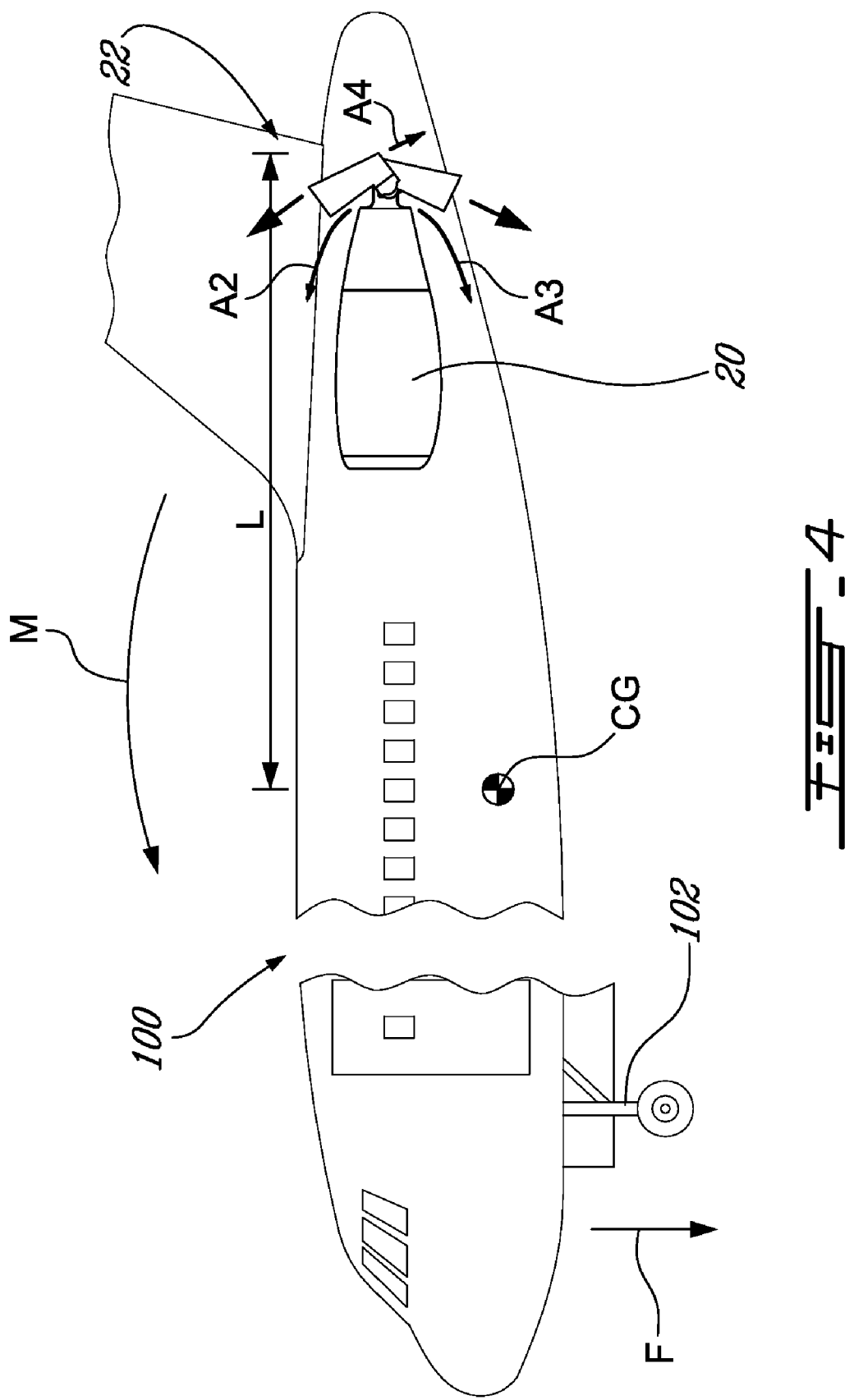
FIG. 4 is a side view showing an example of an aircraft with thrust reversers applying the new concept.

FIG. 4 shows an example of an aircraft 100 during braking on a runway and with an engine having deployed thrust reverser 22, incorporating the present concept, being provided on each side of the aircraft's tail. As can be seen, the efflux A4 coming out through the rear opening creates a force vector acting on the center of gravity CG of the aircraft 100. The force on the lever-arm L generates a nose-down pitching moment M around the center of gravity CG of the aircraft 100, which lever-arm L is relatively long when the engines are tail-mounted. The moment M induces a downward vertical force F on the front landing gear 102. This force F improves controllability of the aircraft 100 and is proportional to the output thrust of the engine.

The value of the moment M produced by the efflux A4 can be tailored through the adjustment of the opening angle of the upper door 24. For instance decreasing the opening angle of the upper door 24 will decrease the vertical component of the efflux A4 and consequently will decrease the value of the moment M. Increasing the upper door opening angle will increase the moment M.

The above description is meant to be exemplary only, and one skilled in the art will recognize that many changes may also be made to the embodiments described without departing from the inventions disclosed. For instance, the exact shape of the illustrated elements (nacelle, doors, etc.) may be different. The aircraft illustrated in FIG. 4 is only an example and the nacelle 20 can also be provided under the wings or within the tail of the aircraft, for instance. The rear opening 40 can have another shape, depending on the shape of the trailing edges 24a, 26a and the relative position of the doors 24, 26. Still other modifications which fall within the scope of the present invention will be apparent to those skilled in the art, in light of a review of this disclosure, and such modifications are intended to fall within the appended claims.

What is claimed is:

1. A thrust reverser for a nacelle of an aircraft's gas turbine engine, the thrust reverser comprising an upper reverser door and a lower reverser door defining a portion of an aft section of the nacelle, the doors having a respective trailing edge adjacent to a propulsive jet outlet of the nacelle, the doors being pivotable together between respective stowed and a deployed positions, the trailing edge of the upper door being positioned behind the trailing edge of the lower door in the deployed position, the trailing edges of the doors in the deployed position delimiting a rear opening that is generally oriented aft and downwardly relative to the engine, the rear opening communicating in use with a portion of thrust generated by the engine to create a nose-down pitching moment on the aircraft.

2. The thrust reverser as defined in claim 1, wherein the trailing edges of the doors have a substantially semi-circular shape, the rear opening defined by the trailing edges being substantially crescent-shaped.

3. The thrust reverser as defined in claim 1, wherein the thrust reverser has a centerline that is collinear with a centerline of the engine.

4. A thrust reverser for a gas turbine engine of an aircraft, the thrust reverser comprising an upper door and a lower door having trailing edges and pivotable between a stowed position and a deployed position, the doors configured and disposed in the deployed position to define a rear opening at said trailing edges to redirect a first portion of an engine thrust forwardly to create a braking force and a second portion of the engine thrust downwardly to create a nose-down pitching moment on the aircraft.

5. The thrust reverser as defined in claim 4, wherein the trailing edges of the doors have a substantially semi-circular shape, the rear opening defined by the trailing edges being substantially crescent-shaped.

6. The thrust reverser as defined in claim 4, wherein the thrust reverser has a centerline that is collinear with a centerline of the engine.

7. The thrust reverser as defined in claim 4, wherein the first portion of the efflux is larger than the second portion of the efflux.

8. The thrust reverser as defined in claim 4, wherein the efflux comprises core and by-pass flows of the engine.

9. The thrust reverser as defined in claim 4, wherein the lower door has a trailing edge that goes within the upper door when the thrust reverser is active.

10. The thrust reverser as defined in claim 4, wherein the nose-down pitching moment M has a magnitude tailored to suit the aircraft.

11. The thrust reverser as defined in claim 10, wherein the nose-down pitching moment is adjusted by modifying an opening angle of the upper door in the deployed position.

12. The thrust reverser as defined in claim 11, wherein the nose-down pitching moment is decreased upon decreasing the opening angle of the upper door in the deployed position.

13. The thrust reverser as defined in claim 11, wherein the nose-down pitching moment is increased upon increasing the opening angle of the upper door in the deployed position.

14. The thrust reverser as defined in claim 4, wherein the thrust reverser is a retrofit component, the engine having a thrust vector produced by the engine that is substantially similar when the doors are stowed to that of the engine before the thrust reverser was added.

15. The thrust reverser as defined in claim 4, wherein, when the doors are deployed, the second portion of the engine thrust is significantly smaller than the first portion of the engine thrust.

16. The thrust reverser as defined in claim 4, wherein the engine is tail-mounted on the aircraft.

17. A method of thrust reversing an aircraft on a runway, the aircraft having at least one gas turbine engine producing an efflux through a jet outlet at a thrust reverser including upper and lower reverser doors, the method comprising the steps of: (a) generating a braking force by deploying said upper and lower doors to redirect a first portion of the efflux; and (b) generating a nose-down pitching moment on the aircraft by deploying said upper door behind said lower door to create a rear opening therebetween oriented downward to redirect a second portion of the efflux at a rear of the engine.

18. The method as defined in claim 17, wherein steps (a) and (b) are performed at a same time.

19. The method as defined in claim 17, wherein the first portion of the efflux is redirected toward a front of the aircraft.

20. The method as defined in claim 17, wherein the second portion of the efflux is redirected toward the rear bottom of the aircraft.

21. The method as defined in claim 17, wherein the nose-down pitching moment is proportional to the efflux produced by the gas turbine engine.

22. The method as defined in claim 17, wherein the aircraft has at least two engines.

23. The method as defined in claim 22, wherein the engines are tail-mounted.

* * * * *